United States Patent
DeCecca et al.

(10) Patent No.: US 7,330,646 B2
(45) Date of Patent: Feb. 12, 2008

(54) CAMERA FILM PREWINDING USING D-SHAPED FILM PERFORATIONS

(75) Inventors: Michael L. DeCecca, Fairport, NY (US); Christopher M. Muir, Rochester, NY (US); Douglas H. Pearson, Rochester, NY (US); Ivan Thompson, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 286 days.

(21) Appl. No.: 11/184,397

(22) Filed: Jul. 19, 2005

(65) Prior Publication Data

US 2007/0019951 A1    Jan. 25, 2007

(51) Int. Cl.
*G03B 17/02* (2006.01)
*G03B 1/00* (2006.01)

(52) U.S. Cl. ............ 396/6; 396/396; 396/512; 232/532.4

(58) Field of Classification Search .......... 396/6, 396/395, 396, 397, 512; 242/532.4
See application file for complete search history.

(56) References Cited

U.S. PATENT DOCUMENTS

| | | | |
|---|---|---|---|
| 3,656,384 A | 4/1972 | Chandler | |
| 3,753,521 A | 8/1973 | Chandler | |
| 4,445,770 A * | 5/1984 | Morse | 396/582 |
| 4,854,203 A | 8/1989 | Wever | |
| 5,337,642 A | 8/1994 | Long | |
| 5,461,450 A | 10/1995 | Long et al. | |
| 5,510,866 A | 4/1996 | Solomon et al. | |
| 5,543,274 A * | 8/1996 | Inaba | 396/323 |
| 6,026,250 A * | 2/2000 | Goto et al. | 396/210 |
| 6,283,645 B1 | 9/2001 | Cramer et al. | |

* cited by examiner

*Primary Examiner*—Christopher Mahoney
(74) *Attorney, Agent, or Firm*—Robert L. Walker

(57) ABSTRACT

A film camera has a body enclosing a light-tight film space. A film unit disposed in the film space, includes a filmstrip having a longitudinally extending row of uniform perforations. The perforations each have at least one concavely-curved edge extending in a direction transverse to the filmstrip. The film space is substantially free of skives despite prewinding of the filmstrip in the camera, even if the prewinding is at a high-torque level.

30 Claims, 13 Drawing Sheets

CAMERA FILM PREWINDING USING D-SHAPED FILM PERFORATIONS

FIELD OF THE INVENTION

The invention relates to film photography methods and photographic film cameras and more particularly relates to cameras having film with D-shaped film perforations and methods.

BACKGROUND OF THE INVENTION

Type 135 (35 mm) photographic film unit is in the form of a cartridge or patrone having a filmstrip joined at one end to a spool held in a canister. The cartridge is commonly marketed in nominal 24 and 36 film frame exposure sizes, with the filmstrip rolled up within the canister except for a protruding leading portion of the filmstrip. One-time-use cameras are commonly marketed, which include a 35 mm film cartridge. In these cameras, the filmstrip is prewound out of the canister of the cartridge, into a coil in a film chamber of the camera. This prewinding can be provided in a dark environment and the film cartridge can be protected from light prior to loading. In that case, the leading portion of the filmstrip is available for image capture. As many as 27 film frames can be captured on a nominal 24 exposure cartridge and as many as 39 film frames can be captured on a nominal 36 exposure cartridge. (It is common practice in one-time-use camera manufacture to use a first film frame or a partial film frame for camera testing and/or preexposure of a stock image. This leaves 26 film frames on a nominal 24 exposure cartridge and 38 film frames on a nominal 36 exposure cartridge.)

During prewinding, withdrawal of the last film frame (number 27 for a 24 exposure film unit or 39 for a 36 exposure film unit) from the canister requires more force than is required for prewinding the rest of the filmstrip. This is due to the fact that the last film frame adjoins a splice that must be pulled through the throat of the canister. The throat is lined with plush and tightly fits against the filmstrip to provide light-tightness. The splice is a segment of tape adhered to the end of the filmstrip. The other end of the tape is adhered or otherwise fastened to the spool.

Some types of one-time-use cameras, which have been prewound to withdraw the splice from the 35 mm film canister, exhibit a higher degree of film debris contamination than similar cameras in which prewinding is stopped prior to splice withdrawal. The film debris is small pieces of filmstrip emulsion layers. Other types of one-time-use cameras, do not exhibit this problem. In the latter cameras, filmstrips have complexly shaped perforations with rolled transverse edges. Each transverse edge is shaped like an undercut embankment, in that a portion of the edge is curled over and protrudes into the perforation opening. These complexly shaped perforations cannot be produced by single pass perforating techniques and equipment, in which a perforation is punched by a single, continuous movement of a punch through the filmstrip. Examples of single pass perforating techniques and equipment are disclosed in U.S. Pat. Nos. 3,656,384; 3,753,521; 4,854,203; 5,337,642; and 5,461,450. Single pass perforating produces edges having an initial flat shear surface extending to a tear surface that angles back away from the perforation opening.

U.S. Pat. No. 6,283,645 discloses a one-time-use camera having a film debris catching comb mounted in the camera to block debris from leaving the film canister chamber during prewinding. This approach has the shortcoming the film debris remains in the camera and, thus, presents a risk of recontamination. The dimensions given for the comb are also quite precise.

Conventional 35 mm film 200 has perforations 202 that are substantially rectangular (rectangular with rounded corners) in shape as shown in FIGS. 6 and 11. Teeth of film transport mechanisms have engagement portions that, in cross-section where the filmstrip is engaged, are also substantially rectangular.

It would thus be desirable to provide cameras, methods, and filmstrips, which reduce debris while allowing use of last, splice-adjoining film frames and single pass perforating.

SUMMARY OF THE INVENTION

The invention is defined by the claims. The invention, in broader aspects, provides film cameras, film units, assemblies, and loading methods. The film camera has a body enclosing a light-tight film space. A film unit disposed in the film space, includes a filmstrip having a longitudinally extending row of uniform perforations. The perforations each have at least one concavely-curved edge extending in a direction transverse to the filmstrip. The film space is substantially free of skives despite prewinding of the filmstrip in the camera, even if the prewinding is at a high-torque level.

It is an advantageous effect of the invention that improved cameras, methods, and filmstrips are provided, which reduce debris while allowing use of last, splice-adjoining film frames and single pass perforating.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
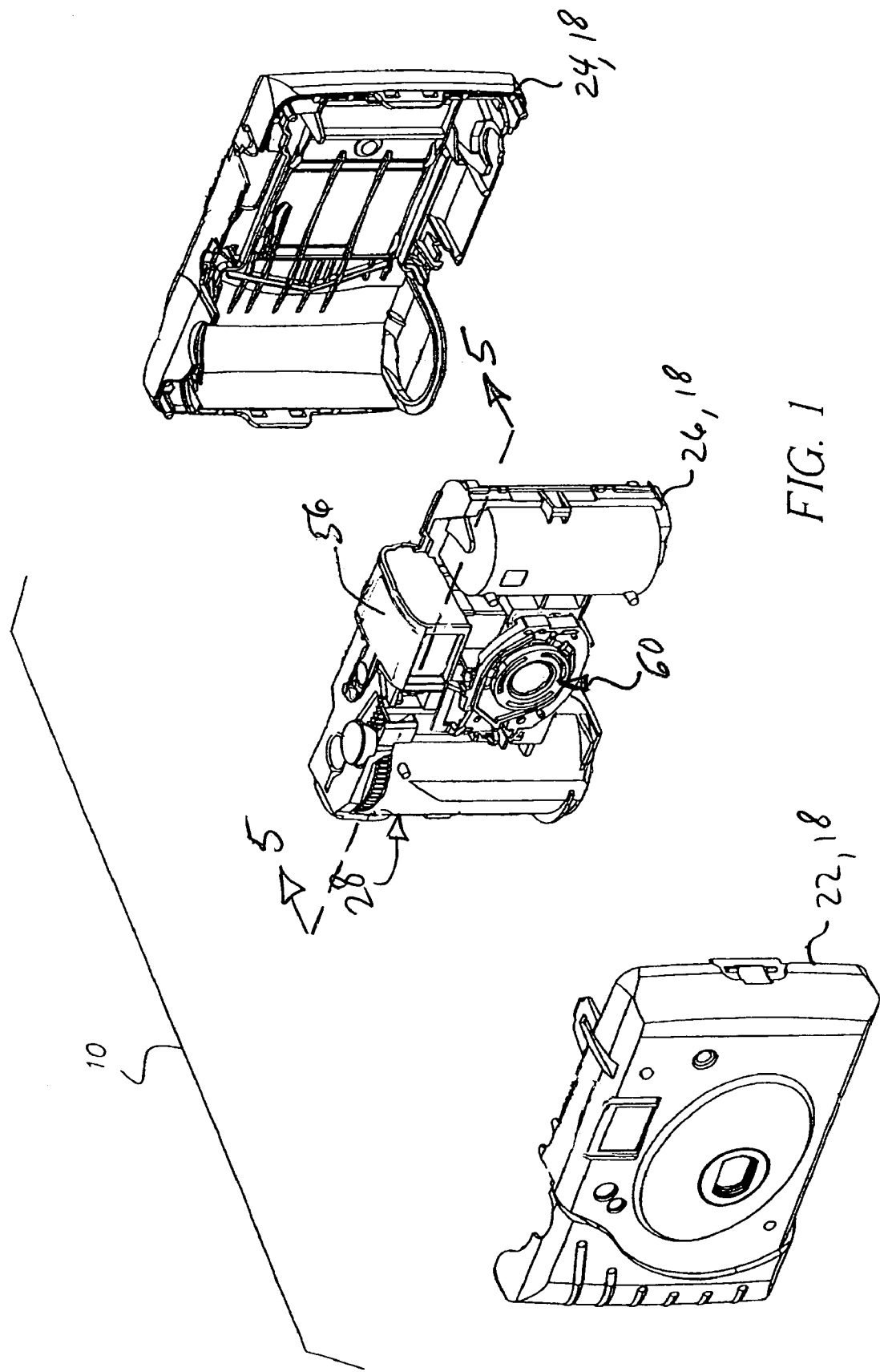
FIG. 1 is a partially exploded front perspective view of an embodiment of the camera.

The debris problem earlier described was approached by examining one-time-use cameras exhibiting the problem. It was determined that the film debris was almost all generated at the end of the prewinding operation. As earlier noted, the debris was associated with use of single pass perforating techniques in the production of the filmstrips of the cameras.

Prewinding can coil the filmstrip onto a spool or a mandrel. (For convenience, the following discussion is limited to use of a spool. Like considerations apply if a mandrel is used.) In either case, initial prewinding tends to overlap turns of the coiled filmstrip without slippage. In order to fit the full exposure length the film must be wound tightly about the take-up spool. At the end of the prewinding, turns of the coiled filmstrip contract and slip against each other until all of the turns are fully tightened. At that point, the splice is pulled out of the canister.

An examination of film winding in actual cameras revealed the source of the film debris. As a convolution or turn of the photographic filmstrip was wrapped about the spool, the long edge of the perforations at that turn tended to bow outward. As the next convolution of the filmstrip wrapped around the previous convolution, the next convolution's perforations tended to interact with the previous buckled perforations. As the film is wound tighter and tighter about the take-up spool, the convolutions slipped relative to each other. The buckled perforations edges were determined to act much like a cheese grater. The support of the filmstrip, typically acetate, is significantly stiffer than the gelatin-based emulsion layers and the support at the edges of the buckled perforations skived off small pieces (also referred to herein as "skives") of the emulsion through this cheese grating action. The typical critical interface was between the long, left-side perforation of an inner convolution, which has buckled out (the cutter) and the long right-side of an outer convolution (the source of the skives).

The skive production seen was related to the manner of film winding, with slippage of convolutions past each other as film with buckled perforations was wound tighter and tighter, rather than other features. Thus, skive production is a risk whenever the film is tightened so as to cause such buckling and slippage.

The skives of emulsion dispersed throughout the film space, during and following prewinding, coming to rest on the filmstrip and the camera. If a skive is present on the surface of a photographic film frame that is used to capture an image, the skive blocks light from reaching the emulsion layers directly below the skive. As a result, this small, unexposed area appears in the final image as a dark region. If the region of the photograph that contains the skive is light in color (e.g. a snowy landscape or a blue sky or gray sky) the dark spot is quite noticeable to individuals who view the photograph. Similarly, if a skive is present on film during scanning, a small miscolored area appears in the final image.

The cameras, filmstrip-film transport assemblies, film cartridges and methods discussed here use a modified filmstrip to reduce skive production when turns of coiled filmstrip slip against each other as the filmstrip is fully tightened. The modified filmstrip retains good transport characteristics in transport assemblies having conventional film sprockets. The benefits of the invention will be apparent from the following discussion of specific embodiments.

Figure 2:
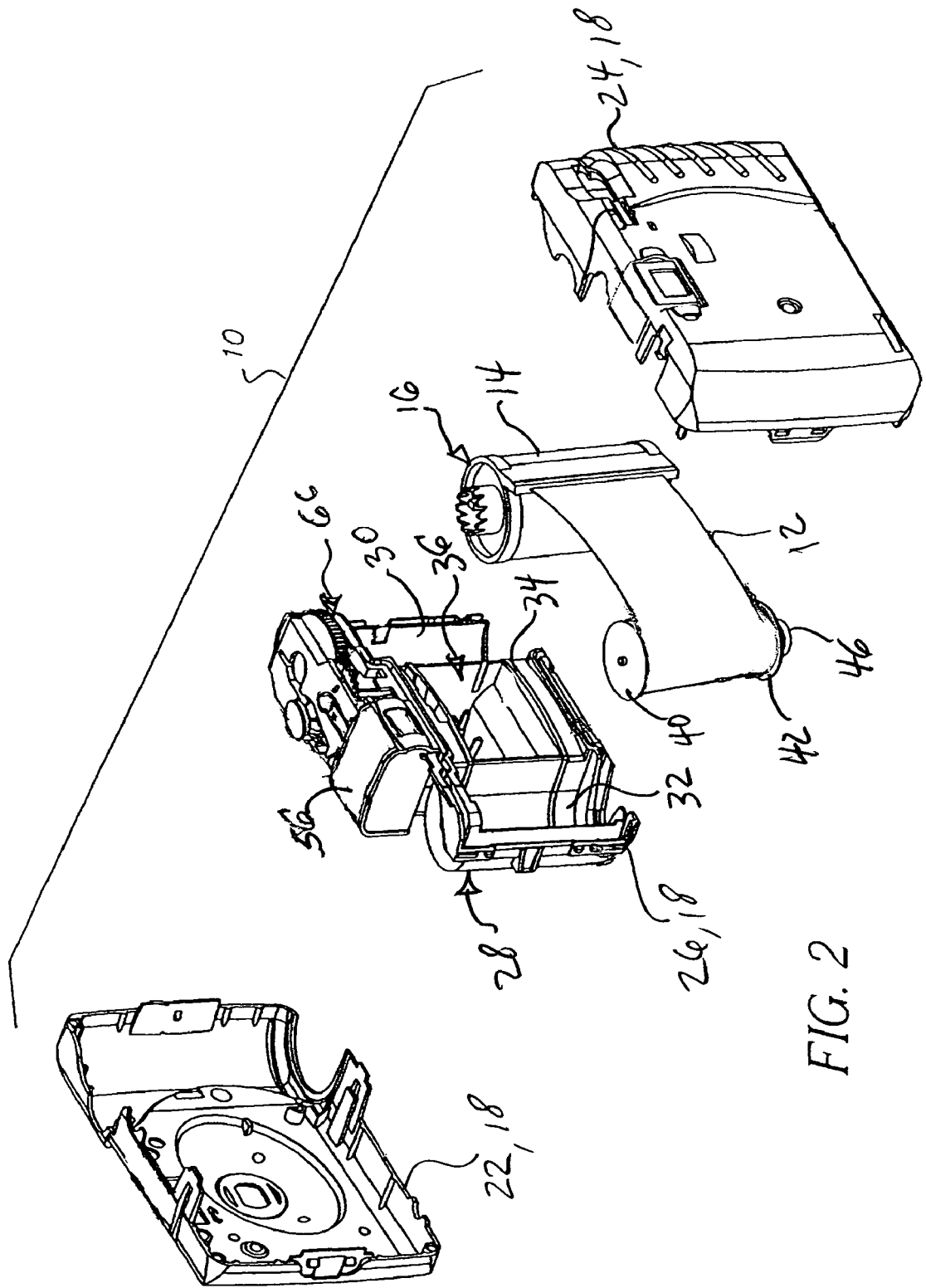
FIG. 2 is a partially exploded rear perspective view of the camera of FIG. 1.
Figure 3:
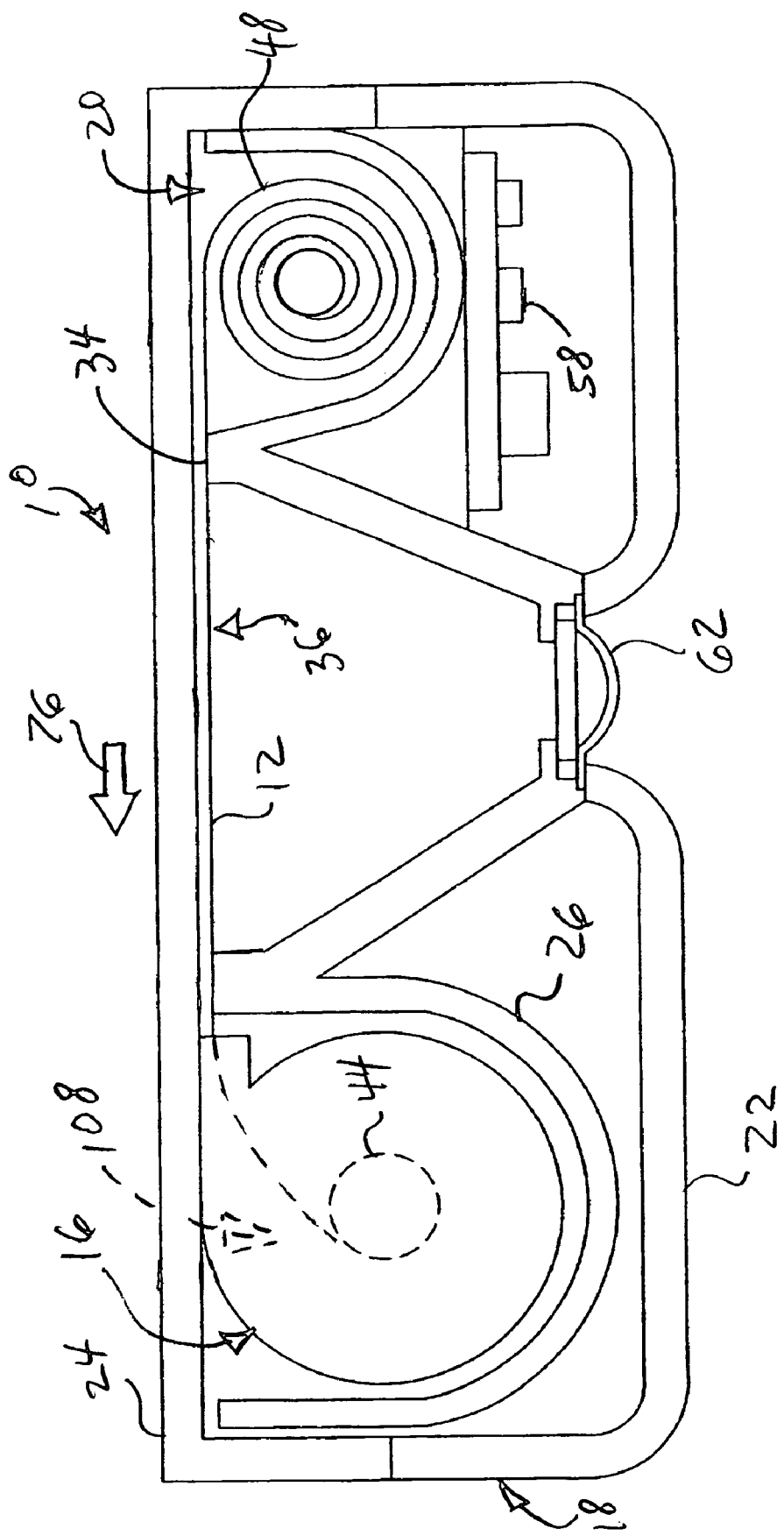
FIG. 3 is a semi-diagrammatical horizontal cross-section through the camera of FIG. 1. The filmstrip is shown diagrammatically.

Referring now to FIGS. 1-3, a prewind-type film camera 10 is shown, in which a filmstrip 12 is prewound before use and is then advanced back into the canister 14 of a film cartridge 16 frame-by-frame following each exposure. This camera 10 is a one-time-use camera of the type that is returned for recycling at the time of photofinishing. In this case, the filmstrip 12 is prewound out of the film canister 14 prior to vending of the camera 10. Similar cameras are sold, in which the filmstrip is prewound prior to vending, but the consumer has the option of reloading a new film cartridge rather than recycling the camera at the time of photofinishing. This distinction from one-time-use cameras is unimportant here.

The camera 10 has a body 18 that encloses a light-tight film space 20. In the embodiment shown, the body 18 has front and rear covers 22,24 and a frame 26 located between the covers 22,24. Other camera components are joined to or trapped against the frame 26 so as to provide a frame unit 28. The covers 22,24 and frame unit 28 are held together by snaps or otherwise fastened or adhered together. The frame 26 has two film chambers: a cartridge chamber 30 and a take-up chamber 32. An exposure frame 34 having an exposure opening 36, is located between the film chambers 30,32.

The film unit or film cartridge 16 is disposed in the film space 20. The film unit 16 has a film canister 14 lodged in the cartridge chamber 30. A canister spool 38 is located in the canister 14. A filmstrip 12 extends from the canister 14, across the exposure frame 34, to the take-up chamber 32. A take-up spool 40 is located in the take-up chamber 32. The take-up spool 40 has a pair of opposed flanges 42 and a drum 44 extending between the flanges 42. The take-up spool 40 also has a drive spline 46 that extends from one of the flanges 42, through the covers 22,24, to the outside of the camera 10. Light-lock features (not shown), well-known to those of skill in the art, are provided at the interface between the take-up spool 40 and the covers 22,24.

The main portion 48 of the filmstrip 12 is in a prewound coil in the take-up chamber 32. The leading end (not separately identified in the figures) of the filmstrip 12 is releasably held by the take-up spool 40; for example, by extending through a slot (not shown) and then being overlapped by turns of filmstrip 12. A tape 50 (shown in FIG. 4) attaches the trailing end 52 of the filmstrip 12 to the spool. The filmstrip 12 and tape 50 are overlapped and adhered together. The overlapped regions of the filmstrip 12 and tape 50, also referred to herein as a "splice 54" are relatively thicker than non-overlapping regions.

Figure 5:
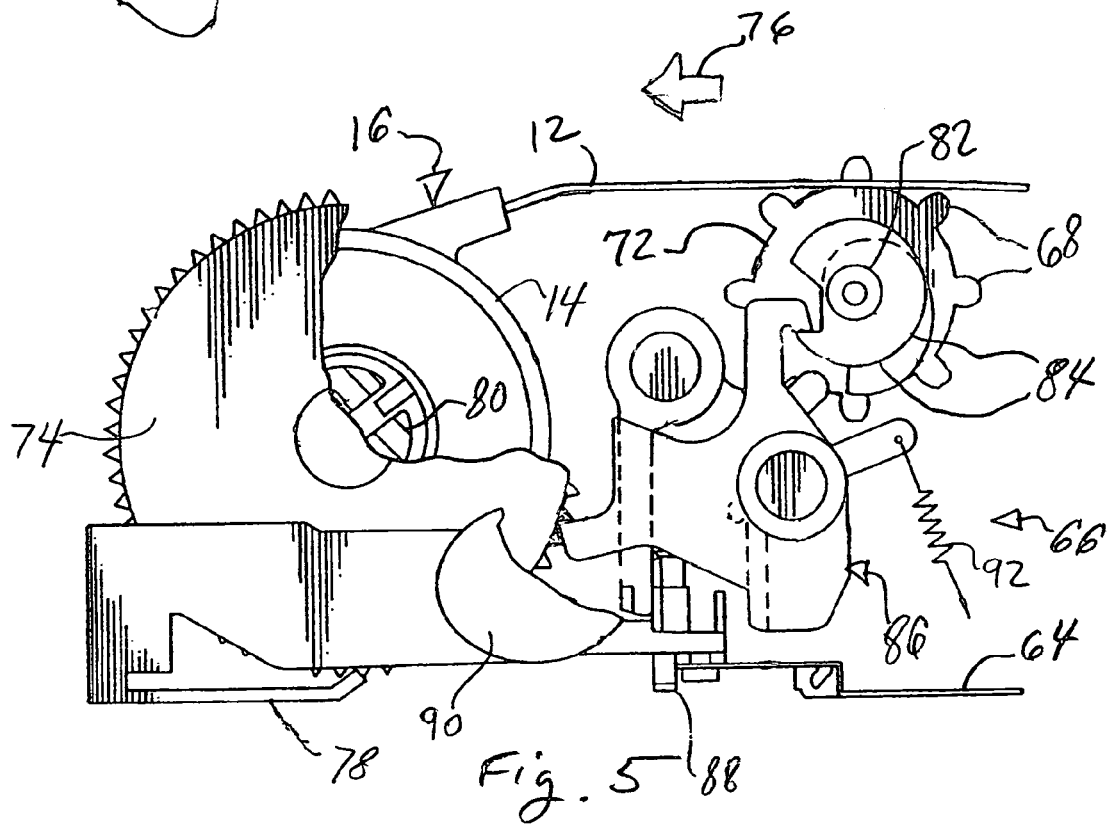
FIG. 5 is a top, partially cut-away, cross-sectional view of the frame unit of the camera of FIG. 1 taken substantially along line 5-5.

The camera 10 has various operational features well-known to those of skill in the art, including a viewfinder 56, flash unit 58, and an exposure system 60 having a one or more element lens 62 and an impact shutter 64. The exposure system 60 directs light through the exposure frame 34 when the shutter 64 is opened. The camera 10 also has a film transport 66 that advances the filmstrip 12 frame-by-frame into the exposure frame 34 and then into the canister 14 following picture taking. The film transport 66 has one or more teeth 68 that engage filmstrip perforations 70 when the filmstrip 12 is advanced or wound in the opposite direction or both. FIG. 5 illustrates the film transport 66 of the camera 10 shown in FIG. 1. In this case, the teeth 68 are on an eight-tooth sprocket 72. Multiple sprockets can be provided. Sprockets can be driven by the film or can drive the film or both, depending upon mode of operation. The teeth 68 can be provided in other manners; for example, on a belt. The number of teeth 68 and perforations 70 can vary per film frame and/or per sprocket 72 or the like.

The film transport 66 shown in FIG. 5 has a thumbwheel 74 that protrudes from the camera 10 and is rotated by the user to advance the filmstrip. The direction of film advance is indicated in this and other figures by arrow 76. An anti-backup 78 blocks reverse rotation of the thumbwheel 74. The anti-backup 78 is disabled during prewinding. The thumbwheel 74 has a coupling 80 that extends light-tightly into the cartridge chamber 30 and engages the canister spool 38. Film movement causes the sprocket 72 to turn, since the teeth 68 of the sprocket 72 protrude through the perforations 70. The sprocket 72 is fastened to and rotates with an axle 82 that also bears a set of cams 84. The cams 84 operate a metering-charging mechanism 86 that locks thumbwheel 74 rotation when the filmstrip 12 has advanced by the length of a film frame plus an interspace (the segment between film frames). The cams 84 also charge a spring-biased striker 88 that is released by depression of a shutter button 90 to strike the shutter 64 and take a picture. The shutter button 90 depression also releases the metering-charging mechanism 86 for advancing and metering the next film frame. Several springs 92 mediate the operation of the metering-charging mechanism 86. A detailed discussion of this type of film transport is disclosed in U.S. Pat. No. 5,510,866, which is hereby incorporated herein by reference. Other types of suitable film transports for in-camera 10 use or for movement of film outside of a camera 10 are well known to those of skill in the art.

Referring now to FIGS. 7-10 and 12-15, the film unit 16 includes a filmstrip 12, which has at least one longitudinally extending row of perforations 70. The perforations 70 each have at least one concavely-curved edge 94*a* extending in a direction transverse to the filmstrip 12. Both transverse edges and can be concavely-curved, but this is not currently preferred, since this is not necessary for skive reduction and the punches required are more complex. In the embodiments shown, each filmstrip 12 has two longitudinally extending rows of perforations 70 and each perforation 70 has one concavely-curved edge 94*a* extending in a direction transverse to the filmstrip 12 and another, straight edge 94*b* extending in a direction transverse to the filmstrip 12. The transverse direction is cross-wise to the filmstrip 12 and, in the embodiments shown in the figures, toward or away from the other row of perforations 70. The concavely-curved edge 94*a* and straight edge 94*b* are joined together at lateral ends by a pair of end edges 96. (For convenience, the concavely-curved edge 94*a* and straight edge 94*b* or pair of concavely-curved edges are referred to collectively hereafter as engagement edges 94.) The end edges 96 each include one or more curved portions and can be entirely curved.

Figure 7:
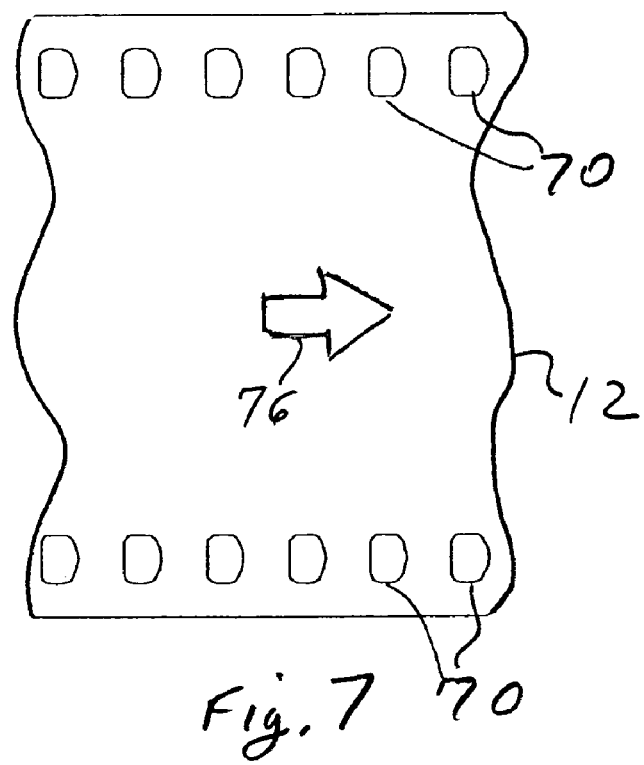
FIGS. 7-10 are rear views of segments of the filmstrips of different embodiments of the camera.
Figure 8:
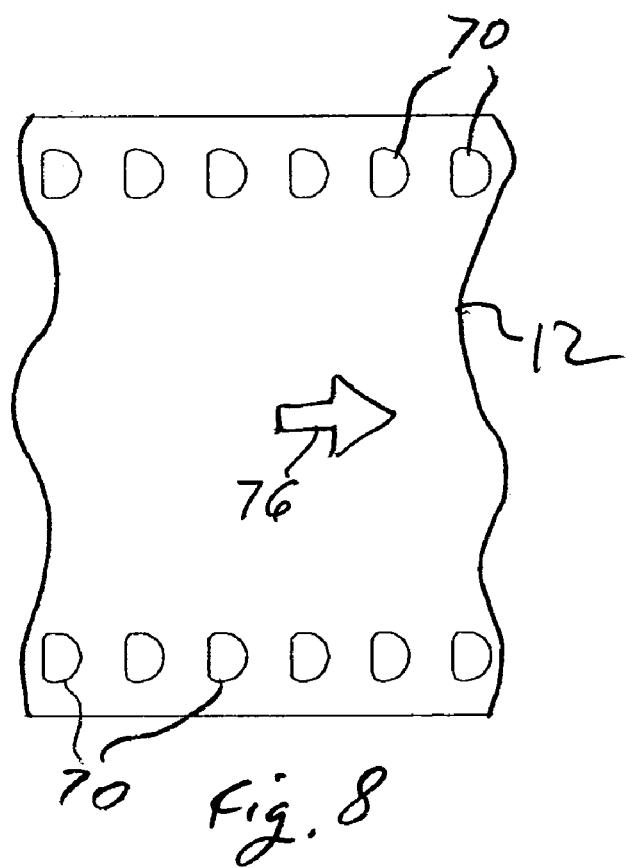
Figure 9:
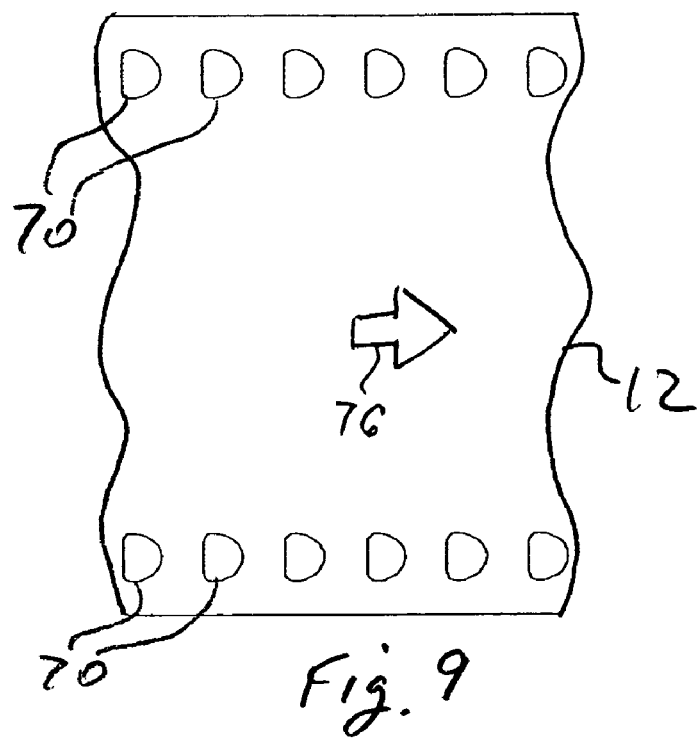
Figure 10:
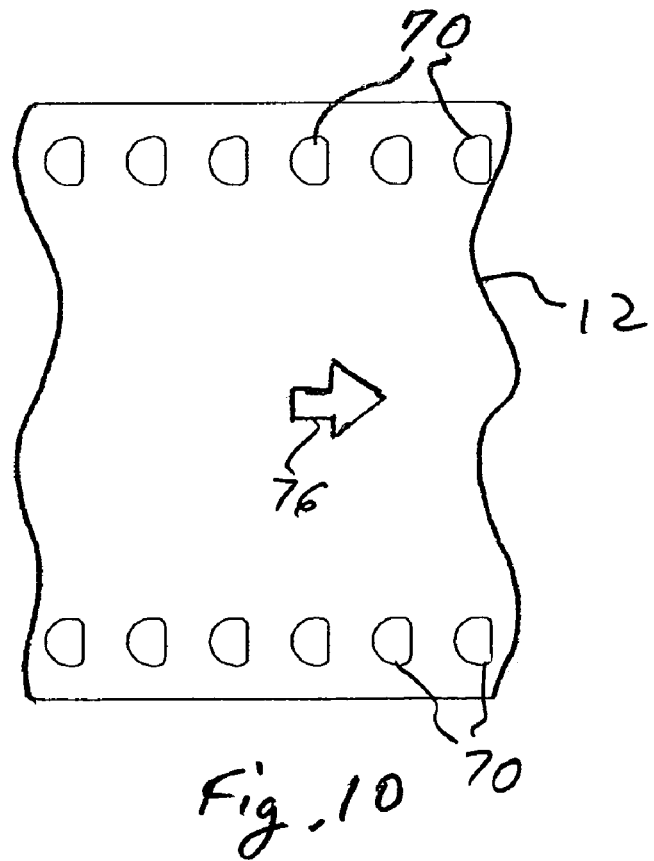
Figure 12:
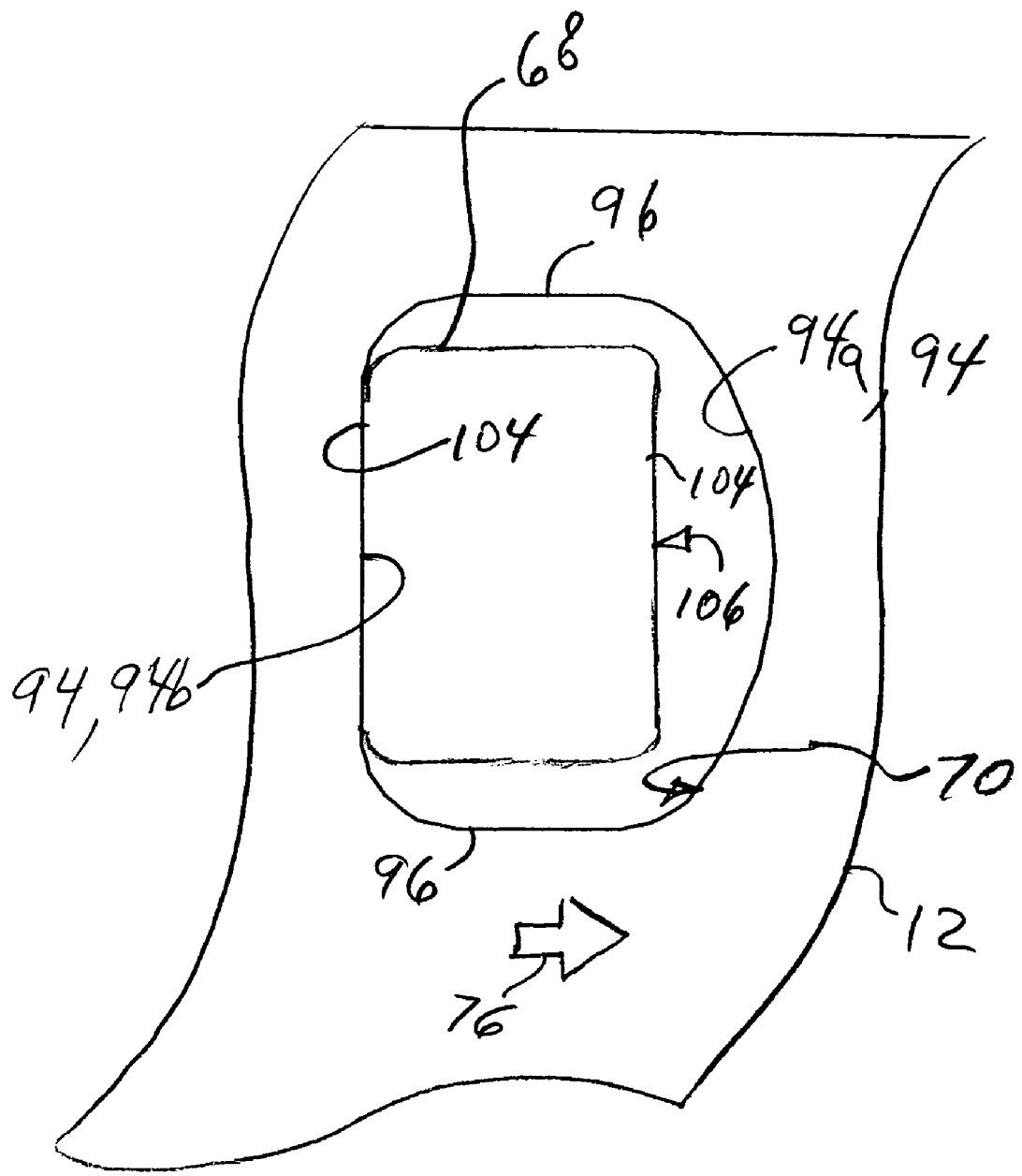
FIG. 12 is a partial enlargement of FIG. 7. A sprocket tooth engaged as during user film advancement is also shown.
Figure 13:
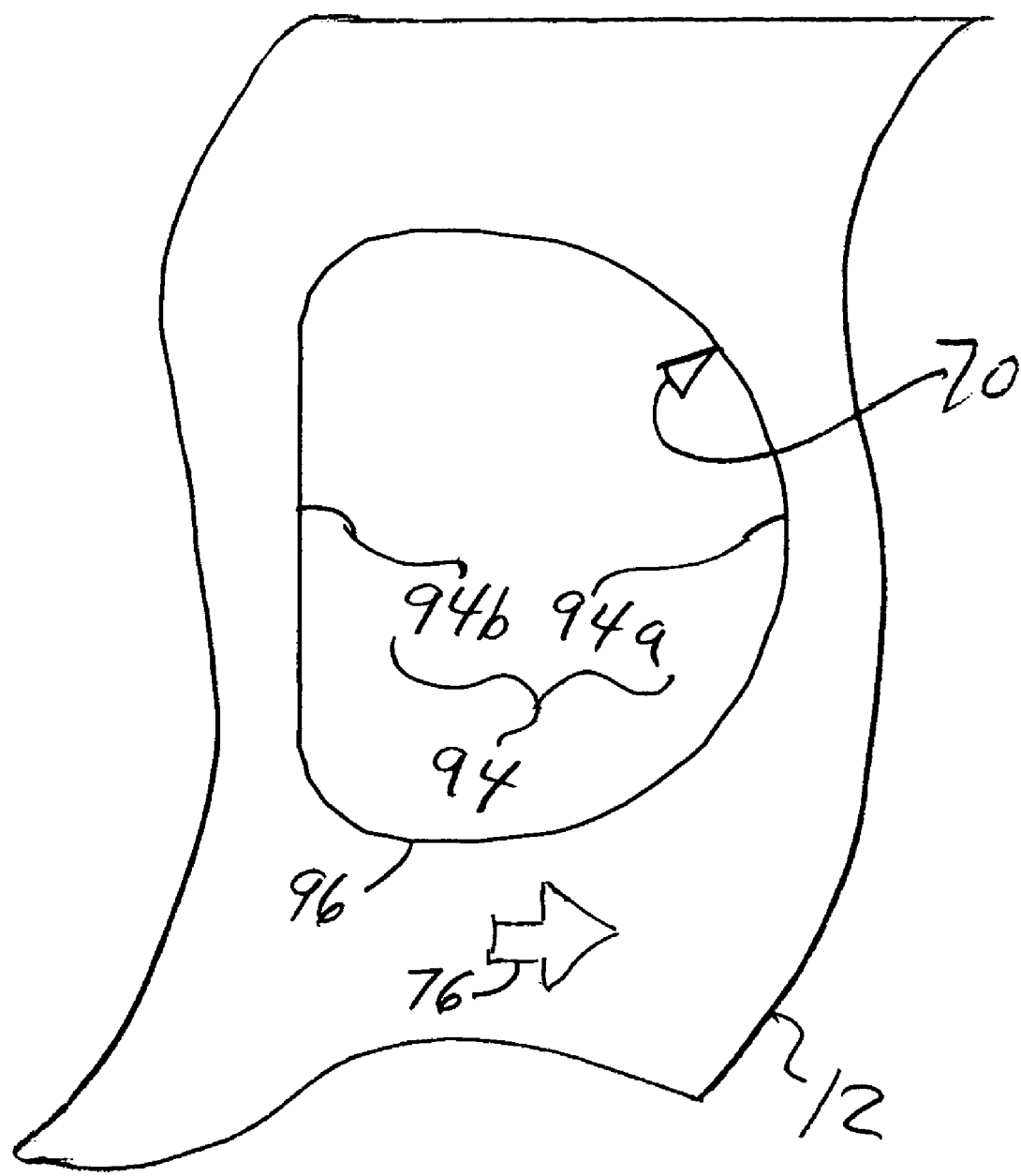
FIG. 13 is a partial enlargement of FIG. 8.
Figure 14:
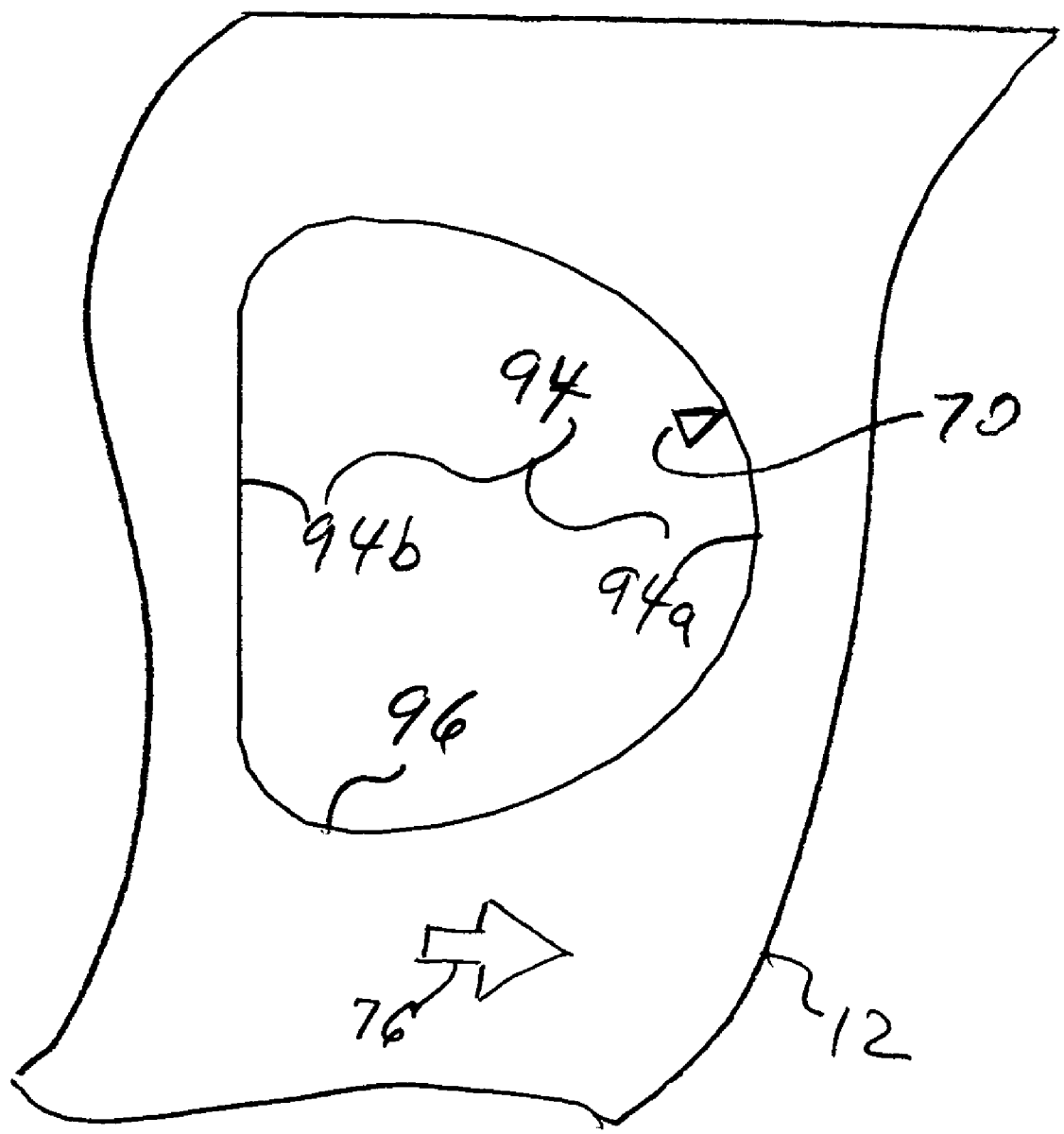
FIG. 14 is a partial enlargement of FIG. 9.
Figure 15:
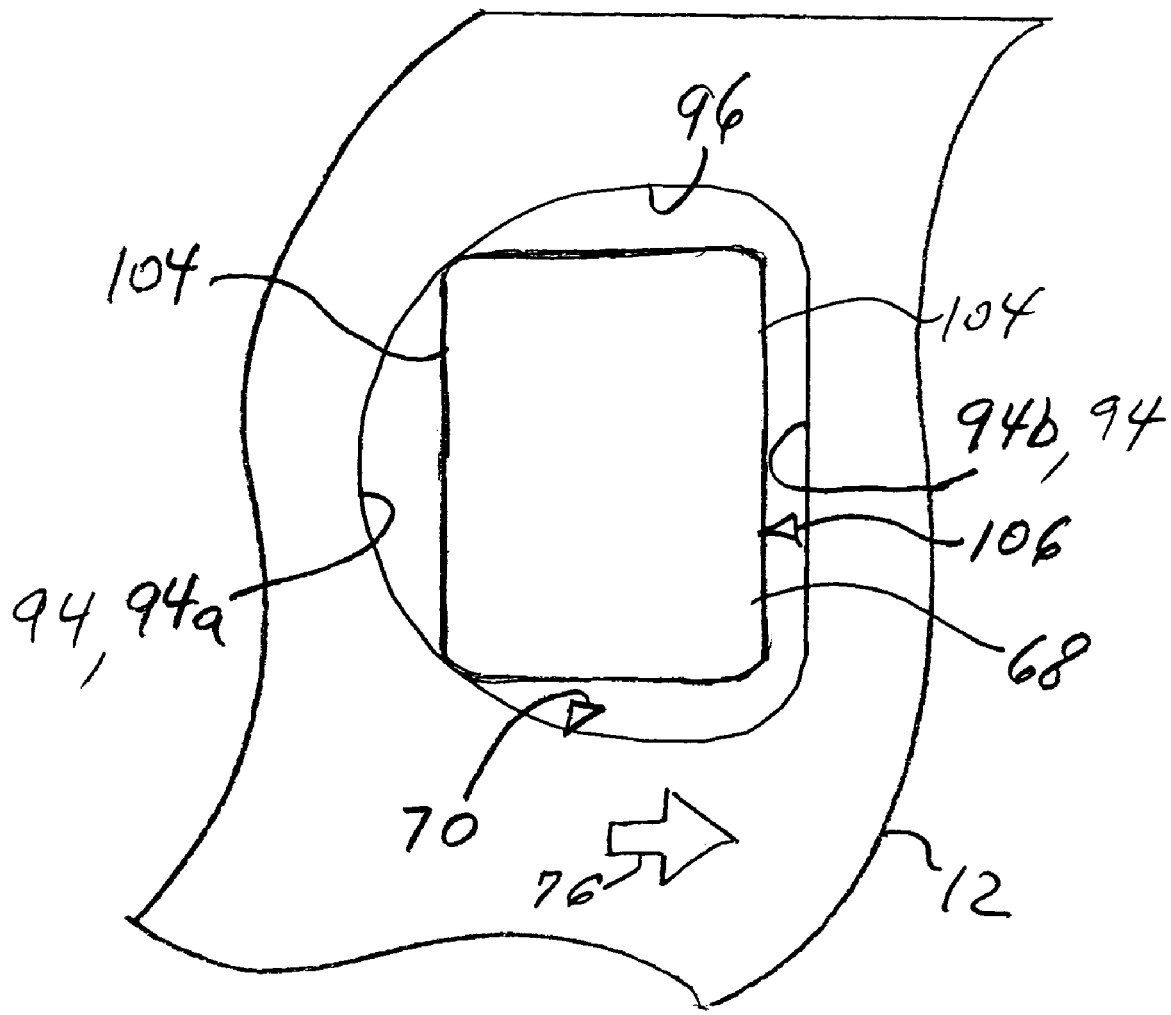
FIG. 15 is a partial enlargement of FIG. 10. A sprocket tooth engaged as during user advancement is also shown.

In the embodiments shown in FIGS. 7-9, the concavely-curved edge 94*a* of each perforation 70 is closer to the canister 14 of the film unit 16 than the straight edge 94*b*. (The concavely-curved edge 94*a* is toward the head of arrow 76 and the straight edge 94*b* is toward the tail of arrow 76.) In the embodiment shown in FIG. 10, the straight edge 94*b* of each perforation 70 is closer to the canister 14 of the film unit 16 than the concavely-curved edge 94*a*. In the embodiment of FIGS. 7 and 12 and the embodiment of FIGS. 8 and 13, the perforations 70 are D-shaped (concavely-curved edges 94*a* toward the head of arrow 76) when viewed in an orientation corresponding to viewing the filmstrip 12 from the back of the camera 10 (looking toward the support (non-emulsion) side of the filmstrip 12 with the canister 14 on the right). In the embodiment of FIGS. 10 and 15, the perforations 70 are shaped like reversed D's when viewed in the same direction. In the embodiment of FIGS. 9 and 14, the concavely-curved edge 94*a* is elliptical and blends smoothly into the end edges 96, rather than being D-shaped.

The filmstrips 12 shown are all compatible with 35 mm cameras 10. With other film types, the pattern of perforations 70 differ. Perforations 70 can also have different shapes in the two different rows of 35 mm film. For example, perforations 70 in the row engaged by the camera film transport 66 can be D-shaped and the perforations 70 of the other row can have another shape, such as substantially rectangular.

Figure 4:
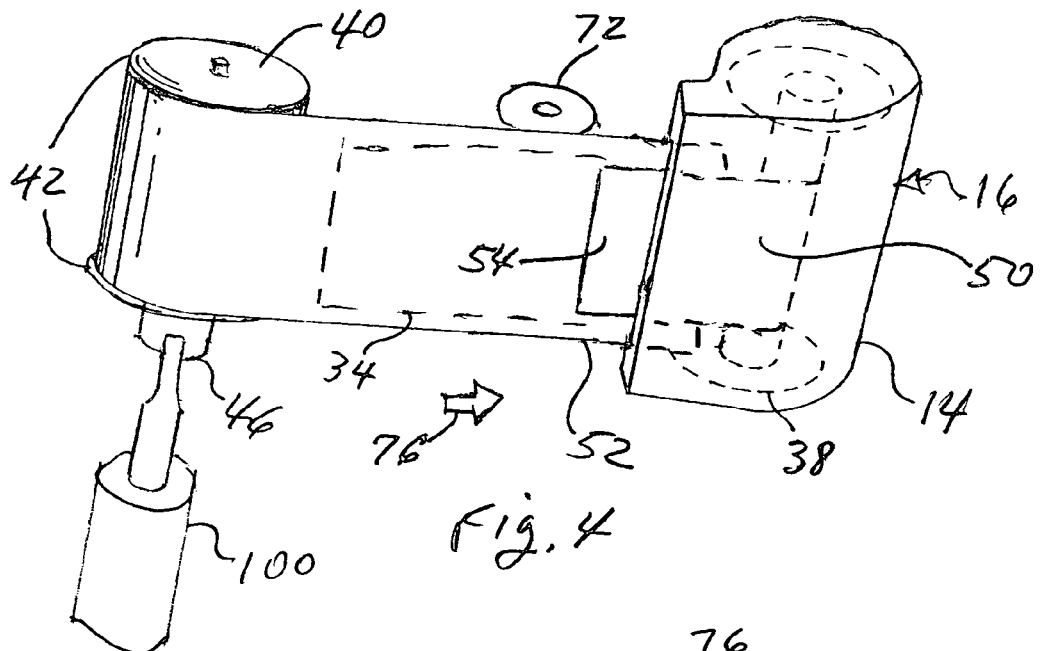
FIG. 4 is a semi-diagrammatical rear perspective view of the filmstrip-film transport assembly of the camera of FIG. 1. A winder is also shown.
Figure 6:
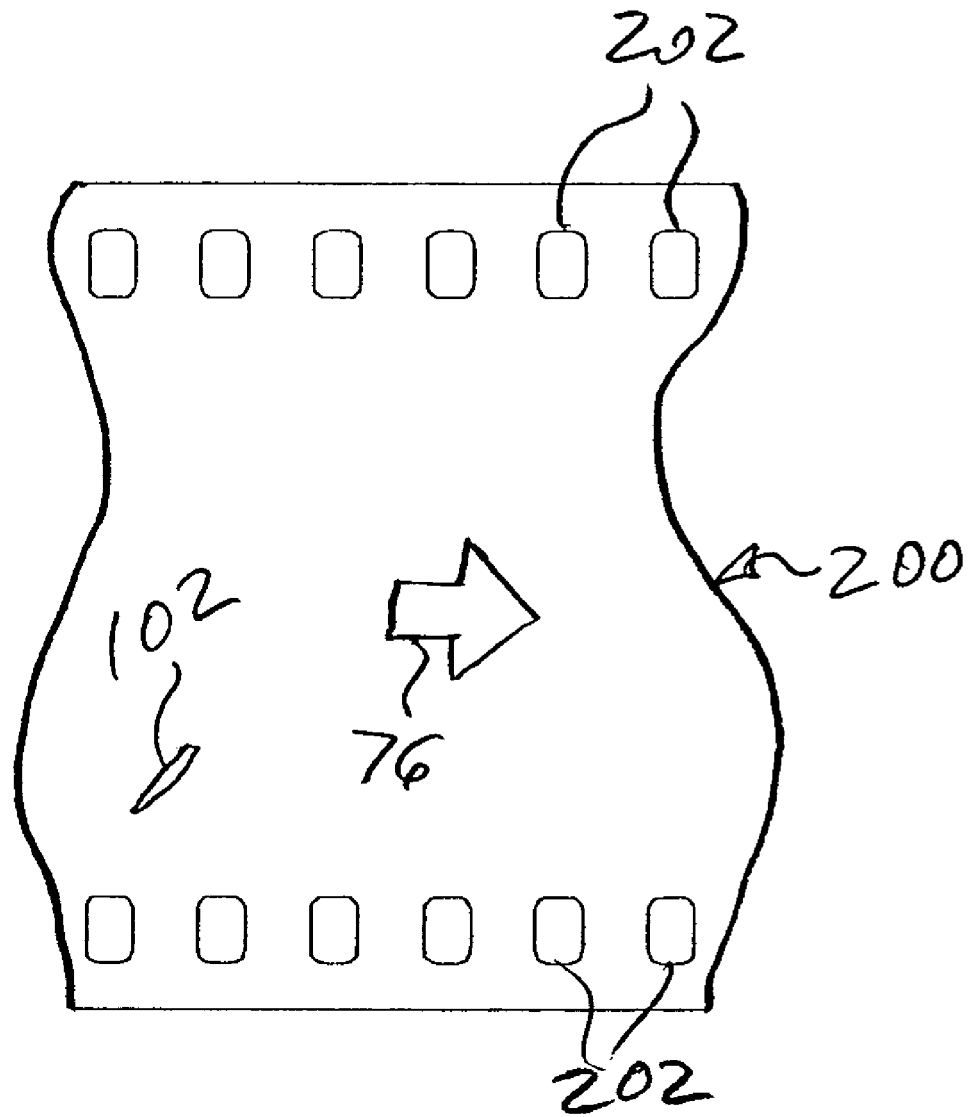
FIG. 6 is a rear view of a segment of a filmstrip of a prior art camera. A skive is shown on the filmstrip.
Figure 16:
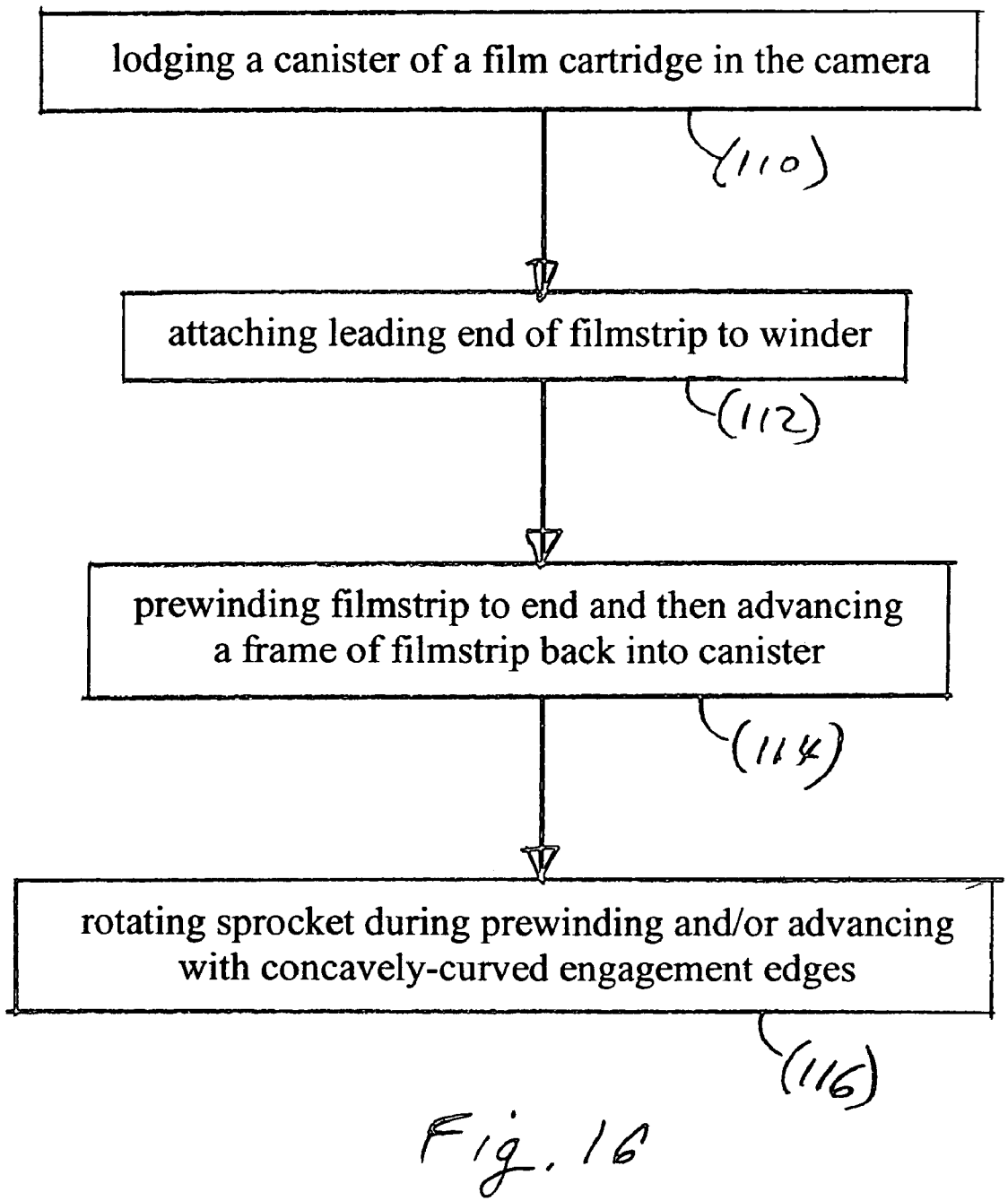
FIG. 16 is a flow chart of an embodiment of the method.

Referring now to FIGS. 4 and 16, in the method, the canister 14 of the above-described film cartridge 16 is lodged (110) in the camera 10 and the leading end of the filmstrip 12 of the film cartridge 16 is attached (112) to a winder. The winder can be a take-up spool 40 or a mandrel (not shown). The winder is then rotated by a driver 100 to prewind (114) at least a major portion of the filmstrip 12 from the canister 14. It is highly preferred that rotation of the winder is continued until the splice 54 is withdrawn from the canister 14, as shown in FIG. 4, since this maximizes the length of filmstrip available for image capture. When splice withdrawal is initiated, the convolutions of the coiled main portion 48 of the filmstrip 12 tighten until all of the convolutions are continuously contiguous with adjoining convolutions and the filmstrip 12 becomes taut across the exposure frame 34. The concavely-curved edges 94*a* of the filmstrip perforations 70 deter formation of skives 102 (shown in FIG. 6) during withdrawal of the splice 54.

Splice 54 withdrawal requires greater force than prewinding of the main portion 48 of the filmstrip 12. For splice 54 withdrawal the winder has a torque greater than or equal to 50 mNm, preferably greater than or equal to 100 mNm, and more preferably greater than or equal to 170 mNm. An increase in the number of skives is associated with an increase in torque during filmstrip prewinding. A decrease in torque is associated with a greater risk of incomplete film withdrawal (the splice remaining in the canister). The high torque level of greater than or equal to 170 mNm ensures splice withdrawal and in camera 10, unlike a conventional camera, does not present an undue risk of an excessive skive contamination. Rotation of the winder can be stopped by detecting the end of the filmstrip 12, but this is unnecessary. It is simpler to continue winder rotation until the winder is stalled by the fully tightened filmstrip 12 and tape 50.

A mandrel must be released from the coiled filmstrip 12 before the camera 10 is closed. If the leading end of the filmstrip 12 is hooked in a slot in the take-up spool 40, the mandrel can be released by rotating the mandrel in a direction opposite that used for prewinding until the filmstrip 12 releases. A filmstrip 12 can be released from the take-up spool 40 in the same manner.

The steps of the film loading method can be performed automatically or using automated equipment with operator intervention at one or more steps. The method steps can also be performed manually using an electric screwdriver or the equivalent for the winder.

In the embodiment shown in the figures, the winder is a take-up spool 40 with an externally positioned drive spline 46. In this case, the camera 10 is closed light-tightly before film winding. If a mandrel is used, then the film winding is in a darkroom and the camera 10 is closed after film winding.

The camera 10 can be completed and vended without further film movement. This is undesirable. With many configurations of camera 10, such as the camera 10 illustrated in the figures, the withdrawn splice 54 overlaps the exposure opening 36 of the frame 26 when all of the filmstrip 12 has been withdrawn from the canister 14. (The exposure opening 36 is indicated in FIG. 4 by a dashed line.) It is also desirable to test film winding and shutter operation following film loading. This requires use of a segment of film. (This segment can be left unexposed like the rest of the filmstrip, by blocking light entry.) The test segment can be advanced back into the canister 14 prior to vending or this can be left to the user prior to initial picture taking.

Figure 11:
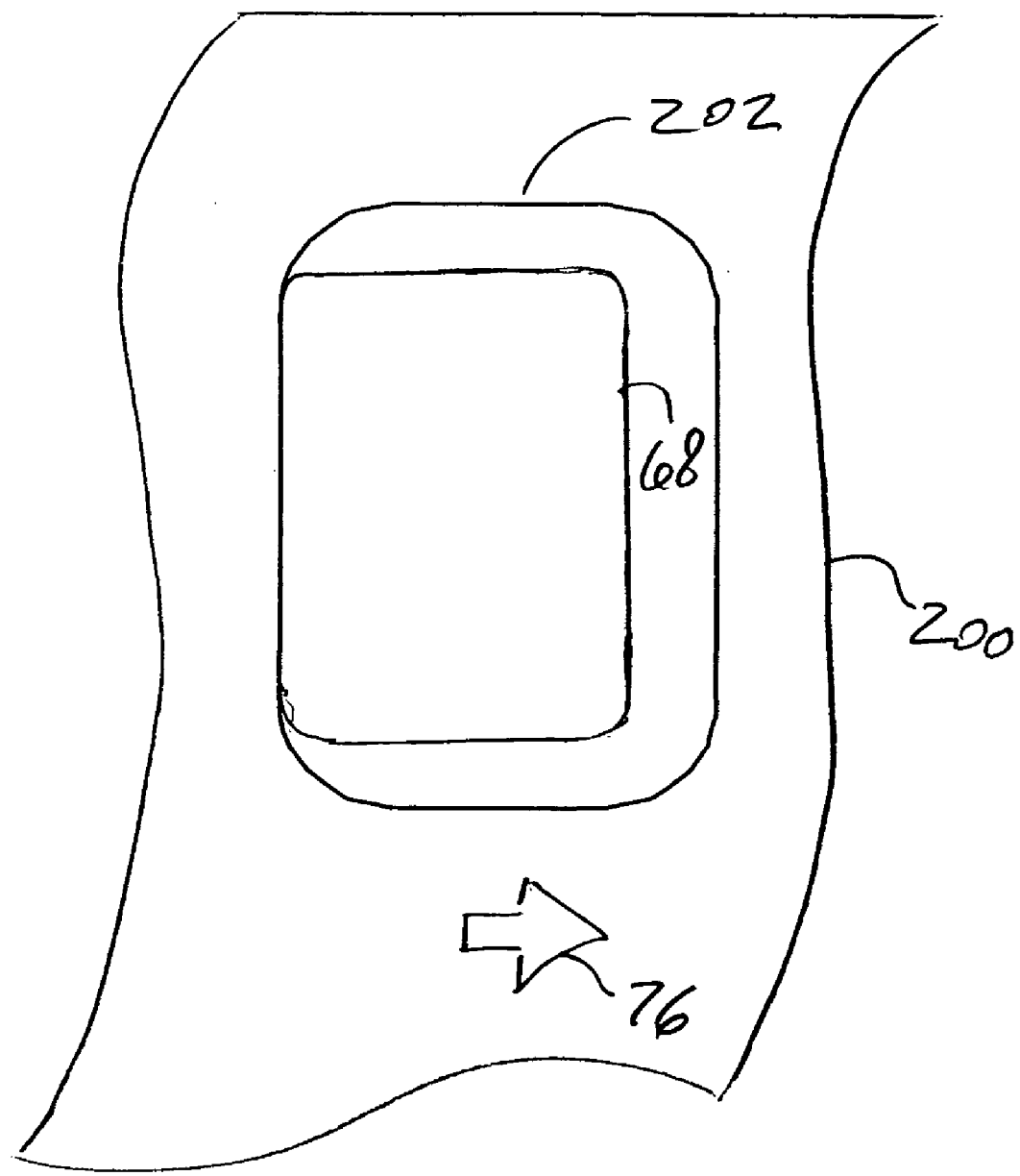
FIG. 11 is a partial enlargement of FIG. 6. A sprocket tooth engaged as during user film advancement is also shown.

Referring to FIG. 5, during the prewinding and the advancing of the filmstrip 12, engagement portions 104 of the teeth 68 of the film transport 66 and engagement edges 94 of the perforations 70 are pulled into engagement. The film transport 66 can be moved by the filmstrip 12 (e.g., prewinding of the filmstrip 12 as illustrated in FIG. 4 rotates (116) the sprocket 72) or can move the filmstrip 12 (e.g., film advance by the film transport 66 of FIG. 5). The engagement portions 104 are parts of the teeth 68 that contact the filmstrip 12 during filmstrip movement. Referring to FIGS. 12-15, the engaged filmstrip 12 defines an imaginary plane or curved-surface that can be extended through a tooth 68 to define an engagement section 106 that includes the engagement portions 104. The engagement section 106 has a different shape than the perforation 70 unlike the prior art shown in FIG. 11. Sprocket teeth 68 tend to be flat sided, such that the engagement section 106 of a tooth 68 provides a substantially rectangular shape with a flat (straight) engagement portion 104 facing each of the engagement edges 94 of a perforation 70.

The prewound cameras 10 each have a film space 20 "substantially free" of skives, that is, the film space 20 is contaminated by less than 1-2 skives. The film unit 16 has an interior 108 that likewise is "substantially free" of skives, that is, the interior 108 has a contamination of less than 1-2 skives. In particular embodiments, the film space 20 and interior 108 each have a skive contamination rate of 0.04 or less. In other words, a family of like cameras 10 or like film units 16 has or would have one skive per 25 cameras/film units or less.

The simulated examples and examples are intended to illustrate the practice of the present invention that is not intended to be limited thereby.

SIMULATED EXAMPLES AND SIMULATED COMPARATIVE EXAMPLES

Traditionally this type of problem would be analyzed through structural finite element analysis. Structural finite element analysis can be divided into two groups: linear and non-linear. For this particular film deflection problem, the ratio of deflection to film thickness is very large. Unfortunately, under these conditions linear finite element analysis has poor fidelity when applied to this case. Although non-linear finite element analysis is better suited for this problem, it requires a means to check the validity of its parameters to ensure the accuracy of the resulting predictions.

To avoid the above-described limitations for linear and non-linear finite element analyses, a physical modeling approach was selected for solving the above problem. This approach used a similitude model (scale model) scaled through a Buckingham Pi non-dimensional ratio as described in E. Buckingham, "On Physically Similar Systems; Illustrations of the Use of Dimensional Equations", *Physics Review*, Volume IV, no. 4, pages 345-376, (1914) and Henry L. Langhaar, *Dimensional Analysis and Theory of Models*, John Wiley and Sons New York, 1951, pages 60-87.

The stress in a beam in bending can be described as $$\sigma = Mc/I$$

where:
σ is the stress in pascals;
M is the bending moment in newton-meters;
c is the distance from the cross sectional centroid to the fiber of interest in meters; and
I is the centoidal moment of inertia (meters⁴).

The radius of curvature of the neutral surface for a beam in pure bending can be found from the equation $$1/\rho = M/(EI)$$

where:
ρ is the radius in meters; and
E is Young's modulus in pascals.

For wide beams a correction factor that predicts the reduced deflection has been found to be $$(1-\mu^2)$$

where μ is Poisson's ratio.

Combining these three equations into a dimensionless ratio for the rectangular cross section of a strip of film yields:

$$\sigma D(1-\mu^2)/(tE)$$

where
D is the diameter of the spool in meters; and
t is the film thickness in meters.

In order to easily judge the effectiveness of a given perforation's configuration it was desired that the model would have at least a ten to one scale factor over the original film perforation system. Therefore, to correctly size the model, the following ratio of the model's and the actual system's Buckingham Pi ratios was employed:

$$\text{Stress}_{prototype}/\text{Stress}_{film} = (D_f/D_p)[(1-\mu_f^2)/(1-\mu_p^2)](t_p/t_f)$$
$$(E_p/E_f) = 1$$

where
Stress$_{prototype}$ is the stress in the large scale prototype;
Stress$_{film}$ is the stress in the actual film system;
D$_f$ is the diameter of the spool in meters in the film system;
D$_p$ is the diameter of the spool in meters in the prototype;
μ$_f$ is Poisson's ratio for the filmstrip;
μ$_p$ is Poisson's ratio for the material of the prototype strip;
t$_f$ is the thickness in meters of the filmstrip;
t$_p$ is the thickness in meters of the prototype strip;
E$_f$ is Young's modulus in pascals for the filmstrip; and
E$_p$ is Young's modulus in pascals for the prototype strip.

The following are typical values for a one-time-use camera photographic film, KODAK MAX™ Versatility Plus 800 Film, manufactured by Eastman Kodak Company of Rochester, N.Y.:
D$_f$=0.00750 m
μ$_f$=0.35
t$_f$=0.000140 m
E$_f$=3.9 GPa.

Phosphor-bronze was selected for the strip of the prototype. Phosphor-bronze has values of:
μ$_p$=0.35
E$_p$=110 GPa.

The following dimensions of the prototype strip were set by the Buckingham Pi ratio:
D$_p$=0.115 m
t$_p$=0.0000762 mm The resulting scale ratio is:

$$D_p/D_f = 0.115 \text{ m}/0.00750 \text{ m} = 15.3$$

A model was built to a scale of 15.3:1 having a spool and four prototype strips matching 35 mm film and a one-time-use camera spool in configuration, except that each of the prototype strips had differently shaped perforations. The prototype strips were made of phosphor-bronze meeting the above-indicated values. The spool of the prototype had a drum, between flanges, which had a diameter of 0.115 m.

Simulated Comparative Example

Baseline Perforations

The model was prepared as above described. The prototype strip had perforations with shape matching the 35 mm film and having an opposed pair of straight long edges and an opposed pair of straight short edges joined by rounded corners. When wrapped about the 0.115 m diameter drum, edges of the perforations buckled outward to the buckle heights indicated in Table 1. (Heights were measured radially outward from the drum to the part of the perforation edge at maximum separation.) A non-linear finite element analysis was also performed for the model. Predicted and observed buckle heights are presented in Table 1.

Simulated Example 1

Full Radius Perforations

The model was prepared and tested as in the Simulated Comparative Example, except that the prototype strip had perforations in which a concave curve having a radius of 0.0216 m replaced one of the long perforation edges. For each perforation, the concave curve was on the long edge farthest from the take-up spool. A non-linear finite element analysis was also performed for the model. Predicted and observed buckle heights are presented in Table 1.

Simulated Example 2

Large Radius Perforations

The model was prepared and tested as in the Simulated Comparative Example, except that the prototype strip had perforations in which a concave curve having a large radius of 0.0305 m replaced one of the long perforation edges. Predicted and observed buckle heights are presented in Table 1.

Simulated Example 3

Elliptical Edge Perforations

The model was prepared and tested as in the Simulated Comparative Example, except that the prototype strip had perforations in which a concave curve having an elliptical shape replaced one of the long perforation edges. Predicted and observed buckle heights are presented in Table 1.

TABLE 1

|  | Actual measured deflection on model | Predicted deflection for model |
|---|---|---|
| Comparative Simulated Example | 0.000508 m | 0.000432 m |
| Simulated Example 1 | approx. 0.00005 m | 0.000203 m |
| Simulated Example 2 | approx. 0.00005 m | 0.000254 m |
| Simulated Example 2 | approx. 0.00005 m | 0.000178 m |

EXAMPLES AND COMPARATIVE EXAMPLES

Photographic film was used having the characteristics used in the modeling of the Simulated Examples and Simulated Comparative Example. The film was Type 135 (35 mm) KODAK MAX™ Versatility Plus 800 Film.

Skives were counted by opening the camera and visually examining all portions of the film space and the filmstrip. Each item of debris was counted as a single skive.

Comparative Example 1

Film with Baseline Perforations

The photographic film cartridge was loaded in the cartridge chamber of a one-time-use camera and the protruding filmstrip leading end of the film cartridge was attached to the take-up spool of the camera. (The camera used was a KODAK POWER™ Flash One-Time-Use Camera, manufactured by Eastman Kodak Company of Rochester, N.Y.) Once the filmstrip was secured to the take-up spool, the rear cover of the camera was secured to the front cover of the camera, creating a light-tight enclosure. The camera had a eight-toothed sprocket. Each tooth was substantially rectangular in cross-section in a direction perpendicular to the longest dimension of the tooth. The drive spline of the take-up spool was engaged by a bit of a film winder. The bit was then rotated to coil the filmstrip onto the take-up spool. The drive motor of the film winder was stalled to stop the winding. The stall torque was set at 170 mNm, which ensured that all the splice was withdrawn from the canister of the 35 mm cartridge.

Once the film was completely withdrawn from the cartridge, as determined by the stalling of the film winder, the camera was ready for skive counting. To count the skives the camera was carefully opened through the removal of the rear cover, over a clean white surface. The rear cover was carefully examined for skives that adhered to the surface as a result of surface charge. Any skives on the rear cover or on the clean white surface were counted and recorded. The film was carefully withdrawn from the take-up chamber, and unrolled over a second clean white surface. Both sides of the film and the cartridge were then examined for skives. Again, skives found on the film, the cartridge and the second clean white surface were counted and recorded. Finally the take-up chamber, the cartridge chamber, the camera's exposure chamber and the camera mechanism were examined with an eye loupe for skives. Any skives observed were again counted and recorded.

The above procedure was repeated for a total of 25 cameras and a standard deviation was determined. The mean of the counts of skives and the standard deviation of those counts is presented in Table 2.

Comparative Example 2

Film with Baseline Perforations

Film was prepared and tested in the same manner as in Comparative Example 1 with a group of 30 cameras. The results are presented in Table 2.

Example 1

Large Radius Perforations-Curve on Forward Perforation Transverse Edge

Film was prepared and tested in the same manner as in Comparative Example 1. The same type of film as in the Comparative Example was perforated: to provide perforations having the same configuration as in Simulated Example 2 with appropriate scaling: the perforations were D-shaped having a concave curved long edge with a radius of 0.00200 m, which is equivalent to the radius of 0.0305 m on the large-scale model of Simulated Example 2. For each perforation, the concave curve was on the long edge farthest from the take-up spool. The film was wound into standard 35 mm canisters. The above procedure was repeated for a total of 25 cameras. To screen for problems during user operation, a second sample of five cameras were checked for proper film advancement and camera operation. The results are presented in Table 2.

Example 2

Large Radius Perforations-Curve on Forward Perforation Transverse Edge

Film was prepared and tested in the same manner as in Example 1 with a group of 30 cameras. The results are presented in Table 2.

Example 3

Large Radius Perforations-Curve on Opposite (Rear) Perforation Transverse Edge

Film was prepared and tested in the same manner as in Example 1, except that, for each perforation, the concave curve was on the long edge nearest the take-up spool, that is, the perforations were shaped like reversed letter D's. The above procedure was repeated for a total of 25 cameras. To screen for problems during user operation, a second sample of five cameras were checked for proper film advancement and camera operation. The results are presented in Table 2.

TABLE 2

| | Sample size | Mean number of skives per camera | Standard deviation of number of skives |
| --- | --- | --- | --- |
| Comparative Example 1 | 25 | 24.2 | 9.04 |
| Comparative Example 2 | 30 | 37.6 | 8.28 |
| Example 1 | 25 | 0.600 | 1.50 |
| Example 2 | 30 | 0.533 | 0.730 |
| Example 3 | 25 | 0.0800 | 0.277 |

The prototypes of the Simulated Examples had a significant reduction in buckle height when wrapped about the drum, comparative to the base line prototype of the Simulated Comparative Example. The buckle height in Simulated Examples 1-3 was approximately an order of magnitude less than the buckle height in the Simulated Comparative Example. The non-linear finite element analysis of the model did not accurately predict observed buckle heights. Predicted buckle heights were many times the buckle heights actually seen in the Simulated Examples.

The Examples and Comparative Examples presented results directly comparable to the Simulated Examples. The mean performance for the baseline perforations in Comparative Examples 1 and 2 was a mean of 24.2 skives per camera and 37.6 skives per camera, respectively. Using the same spooling conditions, the curved edge perforations of Examples 1 and 2 showed a mean of 0.600 skives per camera and 0.533 skives per camera, respectively. This is a reduction of two orders of magnitude relative to the Comparative Examples. The reversed, curved edge perforations of Example 3 showed a mean of 0.0800 skives per camera. The Examples and Comparative Examples exhibited that no degradation in film winding was associated with the changes in perforation shape. Sprockets were successfully rotated by concavely-curved edges of perforations, without film damage.

It is believed that the results of the Simulated Examples and Examples can be explained as being due to the concavely-curved edges of the perforations limiting the buckle of respective perforations and thereby reducing the propensity to generate a cutting surface. In a filmstrip, the concavely-curved edges can be the transverse edges nearer the film canister or the transverse edges farther from the film canister. A mix of nearer and farther edges in the same filmstrip would be undesirably complex, but is not precluded. Presence of the concavely-curved edges on the side farther from the canister was shown to be slightly more effective in reducing skives, but this may be less desirable than providing the concavely-curved edges on the side of perforations nearer the canister. The latter allows contact between camera sprocket teeth and a flat perforation edge. This can provide more accurate film movement in cameras having a sprocket that is canted relative to the exposure frame or that has misshapen teeth.

The invention has been described in detail with particular reference to certain preferred embodiments thereof, but it will be understood that variations and modifications can be effected within the spirit and scope of the invention.

The invention claimed is:

1. A film camera comprising:
   a body enclosing a light-tight film space;
   a film unit disposed in said film space, said film unit including a filmstrip having a longitudinally extending row of uniform perforations, said perforations each having at least one concavely-curved edge extending in a direction transverse to said filmstrip,
   wherein each of said perforations is D-shaped.

2. A film camera comprising:
   a body enclosing a light-tight film space;
   a film unit disposed in said film space, said film unit including a filmstrip having a longitudinally extending row of perforations, said perforations each having at least one concavely-curved edge extending in a direction transverse to said filmstrip;
   wherein said film space is substantially free skives, and wherein each of said perforations is D-shaped.

3. The film camera of claim 2 wherein said film space has a skive contamination rate of 0.04 or less.

4. The film camera of claim 2 wherein said film unit further comprises:
   a canister lodged in said first film chamber;
   a spool disposed in said canister; and
   a tape adhered to said spool; and
   said filmstrip is unexposed and has a main portion coiled in said second film chamber and a trailing end adhered to said tape external to said canister.

5. The camera of claim 4 wherein said body has an exposure frame disposed in said film space; said camera further comprises an exposure system mounted in said body, said exposure system being operable to direct light through said exposure frame; and said tape partially overlaps said exposure frame.

6. The camera of claim 5 further comprising a film transport actuable to advance said filmstrip frame-by-frame into said canister, said film transport including a sprocket having a tooth engaging one of said perforations, said tooth having a cross-section, at said engaged perforation, different in shape than said engaged perforation.

7. The camera of claim 6 wherein said tooth has a substantially rectangular cross-section.

8. The camera of claim 7 wherein said perforations each have a single concavely-curved edge and a straight edge opposite said concavely-curved edge, said concavely-curved edge being closer to said canister than said straight edge.

9. The camera of claim 2 wherein said perforations each have a single concavely-curved edge and a straight edge opposite said concavely-curved edge, said concavely-curved edge being closer to said canister than said straight edge.

10. The camera of claim 2 wherein said perforations each have a single concavely-curved edge and a straight edge opposite said concavely-curved edge, said straight edge being closer to said canister than said concavely-curved edge.

11. A prewound film camera comprising:
a body enclosing a light-tight film space, said body having first and second film chambers and an exposure frame disposed in said film space;
an exposure system mounted in said body, said exposure system being operable to direct light through said exposure frame;
a canister lodged in said first film chamber;
a spool disposed in said canister;
a filmstrip having a trailing end attached to said tape external to said canister, said filmstrip having a longitudinally extending sequence of perforations, said perforations each having at least one concavely-curved edge extending in a direction transverse to said filmstrin,
wherein each of said perforations is D-shaped.

12. The camera of claim 11 wherein said film space has a skive contamination rate of 1-2 or less.

13. The camera of claim 11 wherein said film space has a skive contamination rate of 0.04 or less.

14. The camera of claim 11 further comprising a film transport actuable to advance said filmstrip frame-by-frame into said canister, said film transport including a sprocket having a tooth engaging one of said perforations, said tooth having a cross-section, at said engaged perforation, different in shape than said engaged perforation.

15. A filmstrip-film transport assembly comprising:
a filmstrip having a longitudinally extending sequence of perforations, said perforations each having at least one concavely-curved edge extending in a direction transverse to said filmstrip, wherein each of said perforations is D-shaped; and
a film transport actuable to advance said filmstrip, said film transport including at least one tooth having an engagement section engagable with said perforations, said engagement section having a different shape than said perforations.

16. The assembly of claim 15 wherein said tooth has a substantially rectangular cross-section.

17. The assembly of claim 16 wherein said film space is contaminated by no more than 1 skive.

18. A filmstrip-film transport assembly comprising:
a filmstrip having a longitudinally extending sequence of perforations, said perforations each having a pair of opposed engagement edges, at least one of said pair of engagement edges being concavely-curved, wherein each of said perforations is D-shaped; and
a film transport actuable to advance said filmstrip, said film transport including at least one tooth having an engagement portion engagable with said engagement edges, said engagement portion being straight.

19. The assembly of claim 18 wherein said perforations each have a single concavely-curved edge and a straight edge opposite said concavely-curved edge, and said at least one tooth has a substantially rectangular cross-section and engages said straight edge of said perforations.

20. A method for loading a film camera, the method comprising the steps of:
lodging a canister of a film cartridge in the camera;
attaching a leading end of a filmstrip of said film cartridge to a winder, said filmstrip having a longitudinally extending row of perforations, said perforations each having a pair of opposed engagement edges, at least one of said pair of engagement edges being concavely-curved, wherein each of said perforations is D-shaped;
rotating said winder to withdraw at least a major portion of said filmstrip from said canister; and
during said rotating turning a sprocket with said concavely-curved engagement edges.

21. The method of claim 20 wherein said film cartridge has a canister spool in said canister, said filmstrip is affached to said canister spool by a tape, and said method further comprising continuing said rotating until a splice of said filmstrip and said tape is withdrawn from said canister.

22. The method of claim 21 wherein said winder has a torque greater than or equal to 50 mNm and said continuing further comprises stalling said winder.

23. The method of claim 21 wherein said winder has a torque greater than or equal to 100 mNm and said continuing further comprises stalling said winder.

24. The method of claim 21 wherein said winder has a torque greater than or equal to 170 mNm and said continuing further comprises stalling said winder.

25. A method for loading a film camera, the method comprising the steps of:
lodging a canister of a film cartridge in the camera;
attaching a leading end of a filmstrip of said film cartridge to a winder, said filmstrip having a longitudinally extending row of perforations, said perforations each having a pair of opposed engagement edges, at least one of said pair of engagement edges being concavely-curved, wherein each of said perforations is D-shaned;
rotating said winder to withdraw at least a major portion of said filmstrip from said canister;
advancing a frame of said filmstrip back into said canister;
during at least one of said rotating and advancing steps, turning a sprocket with said concavely-curved engagement edges.

26. A collection of film units, each said film unit comprising:
a filmstrip having a longitudinally extending row of perforations, said perforations each having at least one concavely-curved edge extending in a direction transverse to said filmstrip, wherein each of said perforations is D-shaped.

27. The collection of claim 26 wherein each said film unit further comprises:
a canister having a light-tight interior, said filmstrip being coiled in said interior, said canister and said filmstrip being substantially free of skives.

28. The collection of claim 27 wherein said interiors are contaminated by skives at a rate of less than 1 skive per 25 said film units.

29. The collection of claim 27 wherein said filmstrips are exposed.

30. A collection of film cameras loaded with the film units of claim 27.

* * * * *

UNITED STATES PATENT AND TRADEMARK OFFICE
CERTIFICATE OF CORRECTION

PATENT NO. : 7,330,646 B2 Page 1 of 1
APPLICATION NO. : 11/184397
DATED : February 12, 2008
INVENTOR(S) : Michael L. DeCecca et al.

It is certified that error appears in the above-identified patent and that said Letters Patent is hereby corrected as shown below:

| Issued Patent | | Description of Error |
|---|---|---|
| Column | Line | |
| 8 | 64 | In the Specification, after "$t_p = 0.0000762$", delete "mm" and insert -- m --, therefor. |
| 12 | 44 | In Claim 2, after "free", insert -- of --. |
| 13 | 29-30 (Approx.) | In Claim 11, delete "filmstrin" and insert -- filmstrip --, therefor. |
| 14 | 18 | In Claim 21, delete "affached" and insert -- attached --, therefor. |
| 14 | 39 (Approx.) | In Claim 25, delete "D-shaned;" and insert -- D-shaped; --, therefor. |

Signed and Sealed this

Ninth Day of February, 2010

David J. Kappos
*Director of the United States Patent and Trademark Office*